Sept. 11, 1928.                                                    1,683,715
R. ERBAN
PRESSURE DEVICE FOR FRICTION GEARS, BRAKES, COUPLINGS, AND THE LIKE
Filed Aug. 25, 1924          3 Sheets-Sheet 1
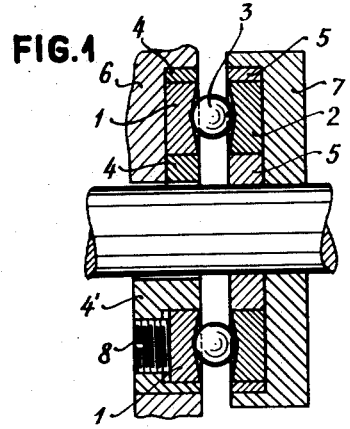
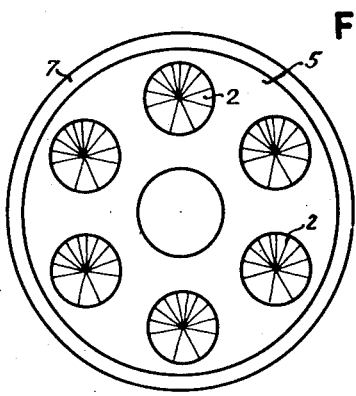
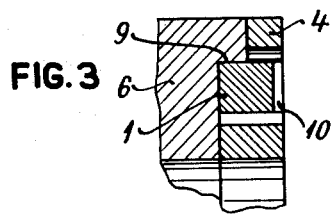
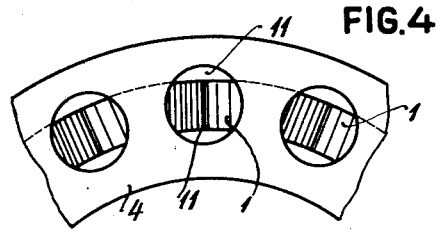
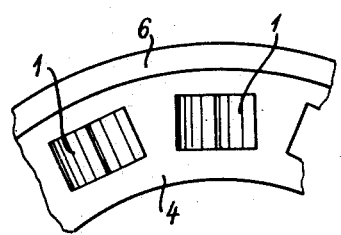
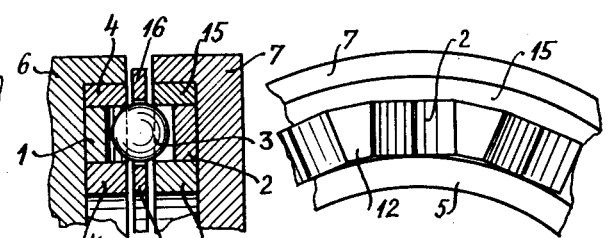
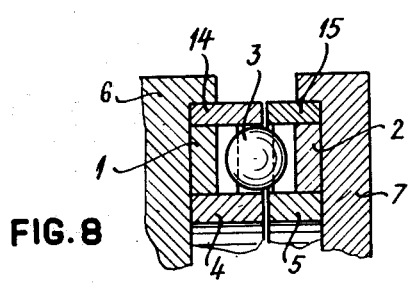
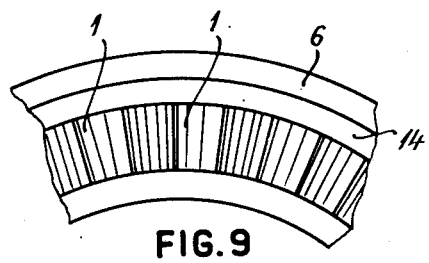
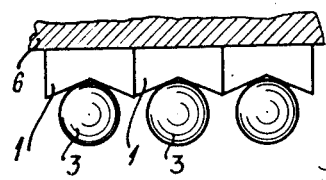
Inventor
R. Erban

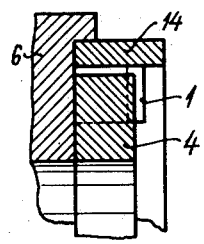
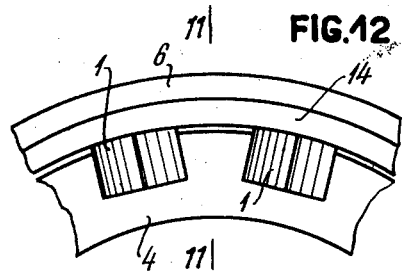
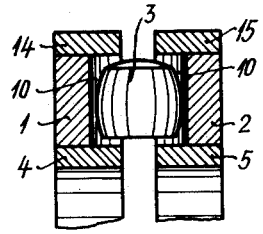
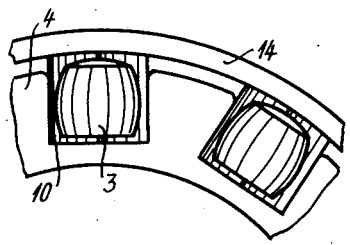
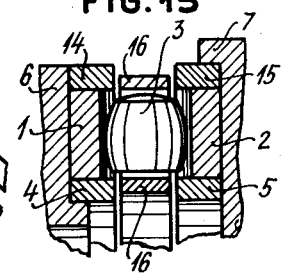
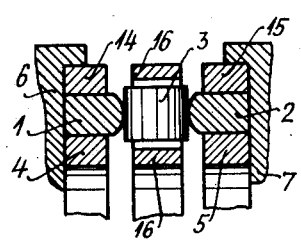
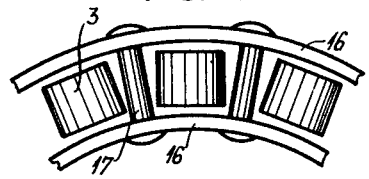
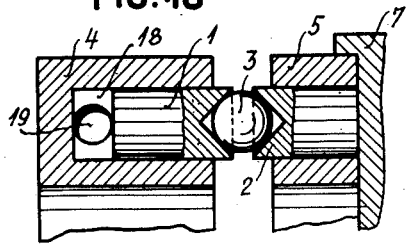
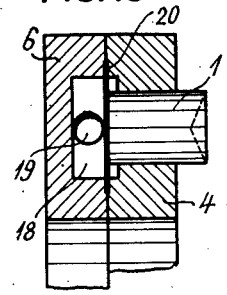

Sept. 11, 1928.  
R. ERBAN  
1,683,715  
PRESSURE DEVICE FOR FRICTION GEARS, BRAKES, COUPLINGS, AND THE LIKE  
Filed Aug. 25, 1924  
3 Sheets-Sheet 3

Patented Sept. 11, 1928.

1,683,715

UNITED STATES PATENT OFFICE.

RICHARD ERBAN, OF VIENNA, AUSTRIA.

PRESSURE DEVICE FOR FRICTION GEARS, BRAKES, COUPLINGS, AND THE LIKE.

Application filed August 25, 1924, Serial No. 734,115, and in Austria September 1, 1923.

My invention relates to friction gears or brakes which are provided with an arrangement, permitting the application of pressure to the parts that are in frictional engagement, which pressure varies in accordance with the load to which the gear or brake is subjected.

Gears of this kind are already known. They are for instance described in my copending applications Ser. No. 668,342 and Ser. No. 603,418.

The object of these devices is, (when applied to brakes) to obtain a definite adjustment of the resistance and when applied to a coupling or a speed multiplying or reducing gear, to prevent slipping of the various parts that are in frictional engagement with each other.

It has already been proposed (see my above mentioned copending applications and similar arrangements) to obtain an axial pressure proportional to the peripheral force, by means of two adjacent disks or rings provided at their facing sides with grooves or recesses having inclined faces with a ball between them. Whenever the disks or rings are rotated relatively to each other, the balls will begin to ascend the inclined faces of the grooves or recesses and will therefore produce an axial pressure, tending to space apart the disks or rings, which pressure is proportional to the peripheral force, causing relative rotational displacement of the disks or rings.

Actual tests with arrangements of the kind mentioned have however shown, that they are not reliable but will frequently fail to act in the desired manner, especially if the various parts of the friction gear are made of hardened steel. The cause for this failure has not been sufficiently cleared up and therefore arrangements hitherto proposed do not constitute a construction fit for practical use.

Now this invention has for its object a construction that will stand any practical test. It is based on other principles than the arrangements heretofore proposed, as the conditions under which such an arrangement will work have been first thoroughly investigated by actual test. These principles are hereinafter explained.

A pressure device of the kind mentioned has to transmit two different forces, an axial thrust and a tangential or peripheral force. Both are distributed however among the balls or other rolling bodies, which are inserted between the disks or rings. Only in theory does there exist a single tangential and a single axial force. In reality there are as many partial forces as there are balls or other bodies between the disks. The friction gear or brake on the other hand necessitates the application of a load which is distributed uniformly along the whole circumference of its race ring, which distribution should moreover in any case be a symmetrical one with respect to the axis of rotation. The axial thrust components that are transmitted by the pressure device should therefore be perfectly equalized, as if this condition is not strictly maintained there results a certain relative obliquity of the parts of the friction gear which causes slipping of the parts on each other and consequently a slow or even rapid destruction of parts or of the whole gear. Now this principle is not realized in the devices hitherto known as no means are provided, which would secure a uniform contact of all the balls and as moreover a detection and correction of the defects of the construction in this respect (which are due to manufacture) is hardly possible with such a construction.

In my invention the recesses into which the balls or other bodies enter are not lodged in the disks or rings but in special independent members, hereinafter called "pressure plates." Their number is double that of the balls, and the pressure plates at each side of the balls form one group or system. All pressure plates of one group are assembled in a common cage-like carrier.

The invention is illustrated by way of exemplification in the accompanying drawings which show a series of modifications.

Fig. 1 shows a section through one form of the invention and in its left hand lower part a second modification both showing pressure plates with conical recesses.

Fig. 2 illustrates a side view of one group of pressure plates with their carrier.

Figs. 3 and 4 show part of a section and of a side view of another modification in which the pressure plates have recesses provided with roof like inclined plane faces at their working ends.

Figs. 5 and 6 show another modification of the pressure plates with inclined plane faces in section and in sectional and plan views respectively.

Fig. 7 shows another way of mounting the pressure plates between rings in which holding sectors have been inserted between the pressure plates.

Figs. 8, 9 and 10 show part of a cross section, part of a plan view of a group of pressure plates and part of a longitudinal section respectively through another modification with pressure plates having inclined plane faces and with a ball cage formed by an extension of the carrier disks.

Figs. 11 and 12 show another modification in which the pressure plates are mounted in slots in one ring and are held in the same by another ring.

Figs. 13 and 14 show part of a cross section and part of a plan view respectively of another modification in which rollers are used instead of the balls between the disks or rings of the pressure device.

Fig. 15 shows another modification in cross section in which separate rings are used for holding the rollers in their place.

Fig. 16 shows an embodiment of the invention in which cylindrical rollers are used in the pressure device and in which the faces of the pressure plates are convex.

Fig. 17 shows the cage for cylindrical or convex faced rollers.

Figs. 18 and 19 show a device for equalizing the pressure exerted on the pressure plates by means of a fluid.

Fig. 21 shows the application of the device to a brake or coupling, which is partly broken away and partly in section.

Figure 20:
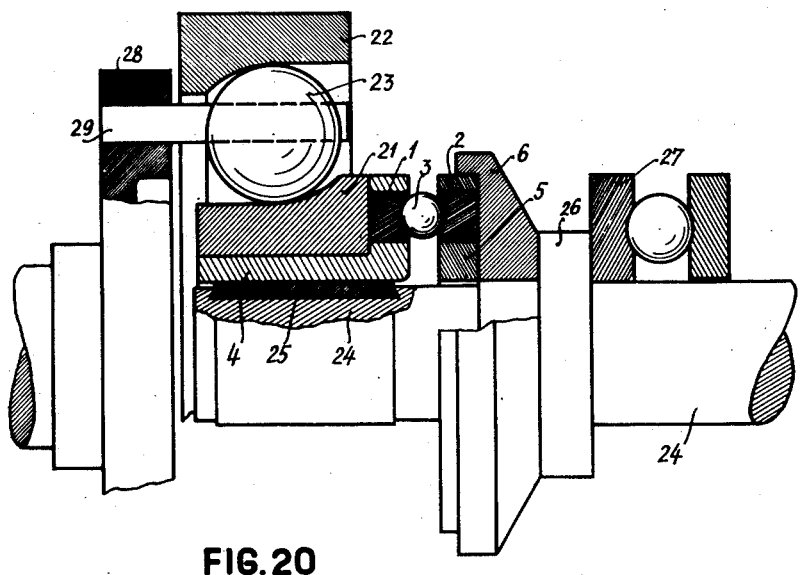
Fig. 20 shows the application of the pressure device to a friction gear which is partly broken away and partly in section.
Figure 24:
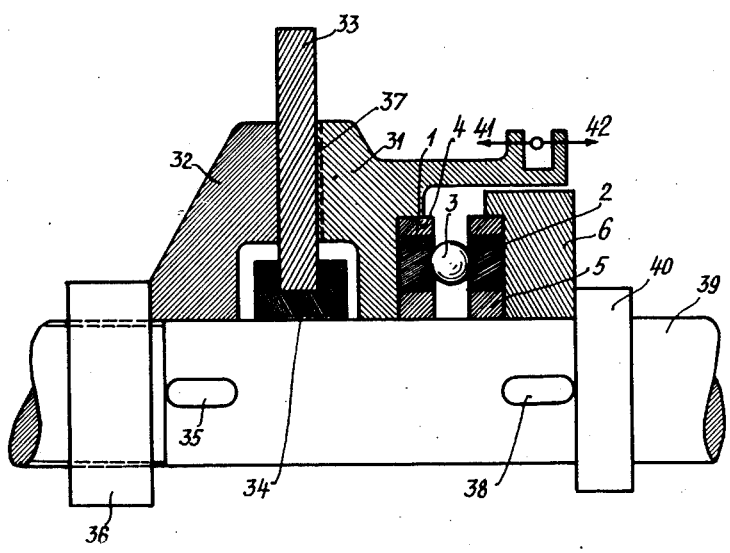

In the arrangement shown in Figures 1 and 2, 1, 2 designate a cylindrically shaped pressure plate of the left hand group and the right hand group respectively. Between them the balls 3 are held in position. Inclined faces are formed by conical recesses on the outer face of the pressure plates. All the pressure plates 1 of one group are assembled within a carrier disk 4, all those of the second group 2 within a second carrier disk 5. The pressure plates are made of hardened steel, and the disks may be made of any suitable material, which need not be hardened. It is assumed that six balls will be used and therefore each group contains six pressure plates. To allow a very accurate and exact working of the gear to which this pressure device is to be applied, all the balls must have contact in identical manner within the recesses. They must be exactly alike in diameter, and the bores within the carrier disks 4 and 5, within which the pressure plates are located, must exactly face each other. This can be obtained without difficulty by boring the same simultaneously. Moreover the working faces of all the pressure plates which contact with the balls must be exactly within the same place. This may be obtained by pressing the same simultaneously down into their position between the carrier disks 4 and 5. The transmission of the axial thrust from the balls to the carrier disks can in this case only be effected by the cylindrical outer faces of the pressure plates. This mode of fastening the pressure plates is however only suitable for relatively small pressures and would not be reliable in the event of greater pressures to be transmitted. In such cases base plates 6 and 7 are used against which the pressure plates may abut. In such a case to ensure equal position of all the pressure plates relatively to the plane in which the balls make contact, screw spindles 8 are provided, as shown in the lower half of the left hand side of Figure 1, the end faces of which bear against the pressure plates, while the screws themselves are threaded into the base plates. The most simple and inexpensive method however is to grind all pressure plates down to equal height and to let them bear against the common base plate 6 or 7 respectively as shown in Fig. 1. The carrier disks 4 and 5 serve in this case for transmitting the tangential force on the pressure plates and for holding the same in their true relative position, while the whole axial pressure is borne by the base plates.

The conical recess shown in Fig. 1 can be substituted in many cases, especially where manufacturing a series of inclined faces simultaneously is to be considered by inclined plane, wedge or roof like faces, as shown in Fig. 3 of the drawing. Such faces can be more easily manufactured, as a great number of pressure plates can be made simultaneously, all being exactly alike without any further individual finishing. In this case however means must be provided, which prevent the pressure plates from angular movement within their bores; such a means consists in providing the cylindrical pressure plates with plane faces by grinding or otherwise and by inserting a holding ring.

This arrangement is shown in Figs. 3 and 4 which however show only one half of the arrangement without balls. In these figures 1 designates the pressure plates, with a roof like contact face and plane faces 11, 4 is the carrier ring. The base plate 6 is provided with an annular projection 9, which protrudes, so as to abut against the plane faces 11 of the pressure plates.

To allow further simplification, the pressure plates may be prismatic so as to have an almost rectangular cross section. Arrangements of this kind are shown in Figs. 5 to 12 inclusive. The arrangement according to Figs. 5 and 6 shows prismatic pressure plates, having a rectangular cross section, which are inserted in rectangular holes of the carrier disks. The axial thrust is transmitted to the base plate 6. As shown, the contact faces are plane and inclined like those of a saddle-roof. The two lateral faces of the pressure plates (the shorter sides of the rectangle) and the roof like inclined faces may be manufactured in common for a whole series of plates, which are assembled with their longer lateral faces closely abutting and are clamped together in the machine during the working of the faces. Thereby exact similarity of all the pressure plates can be obtained without much cost for the handwork.

The position of the balls in this arrangement is however not a fixed one in radial direction, as in the case of conical recesses and therefore the balls must be held by a cage 16 in their correct position at the proper distance from the axis of the carrier disk or ring.

Instead of boring rectangular holes into the carrier-disk as shown in Fig. 6, it is possible to form a ring out of the rectangular pressure plates 2 by interposing sector-shaped intermediary members 12 (Fig. 7). The whole structure is held together by a carrier-ring 15 and if necessary to obtain greater strength also by an inner carrier ring 5.

Figs. 8, 9 and 10 show an arrangement, in which the prismatic pressure plates themselves adopt the form of a sector. They may be assembled without intermediary members to a ring, which is held only by carrier rings 14 and 4 or 15 and 5 respectively pressed against the pressure plates.

Fig. 10 shows a developed cylindrical view taken at the outer periphery of the plate 1 in Fig. 8. These pressure plates, against which the balls 3 are bearing, are supported at their other end by the base plate 6. Moreover Figure 8 shows how the carrier rings 4, 14, 5, 15 may be shaped in order to avoid the arrangement of a cage or of race rings for the balls 3. The contact faces according to Fig. 11 may be helicoidal in the event that great angular displacement between the carrier rings occur.

Fig. 11 represents part of a section along the line 11—11 of Fig. 12. The pressure plates according to this arrangement are inserted into rectangular notches or incisions of the carrier ring 4, open at their top. They are held in their position by a second ring 14 pressed against their outer side. The axial thrust is transmitted to the common base plate 6. This arrangement is the preferred one as a great number of inner carrier rings 4 may be provided with notches at the same time, which are then perfectly similar and may be interchanged freely.

Figs. 13 and 14 show a modification similar in every respect to that of Fig. 11 but having rollers 3 with convex or curved side faces. It is a well known advantage of rollers that they will carry a greater load than balls. The rollers may be inserted between inclined roof like plane faces or between helicoidal faces. The employment of rollers however necessitates guiding and guide faces are therefore provided directly on the carrier rings 4—14 and 5—15. The mantle surface of the roller is convex or curved as shown in a somewhat exaggerated manner. The radius of the curve must however not exceed the length of the inner radius of the outer carrier ring 14.

Fig. 15 differs from Fig. 13 only in so far as it shows the provision of a special cage 16 for the rollers.

Fig. 16 shows another modification of the arrangement in which cylindrical rollers are used. In this figure 1 and 2 are the sector-shaped pressure plates which are fixed between the carrier rings 4, 14 and 5, 15 respectively. The axial thrust is transmitted to the base plates 6 and 7. The contact face of the pressure plates must in this case be provided with a convex curvature to avoid jamming of the cylindrical rollers.

Fig. 17 shows the cage 16 which is held together by bolts 17 and which serves to hold the rollers in their correct position.

Figs. 18 and 19 show a system for equalizing the pressure exerted on the pressure plates by means of a fluid. A group of cylindrical pressure plates 1 is slidably arranged in cylindrical bores in which they may move like pistons. The free spaces 18 beneath the pressure plates are in communication with each other by means of channels 19. The spaces 18 and channels 19 are filled with some liquid for instance oil. If the pressure device is subjected to pressure all the pressure plates will automatically adopt such a position that they will be capable of transmitting equal axial thrusts, as the liquid will cause instantaneous compensation between any differences of pressure that may occur. Of course a normally sealed opening not shown is provided for filling the spaces 18 and channels 19 with liquid. As it is necessary to prevent leakage and as the fluid tightness must be a permanent one it may be of advantage to employ a membrane 20 to obtain fluid tightness as shown in Fig. 19. The displacement of the pressure plates is only a very slight one and therefore the use of membranes is unobjectionable. The pressure plate according to this arrangement transmits the axial thrust to the membrane 20 which shuts the chamber 18 filled with the fluid at the side of the pressure plate. The chambers 18 are in communication with each other by means of channels 19 as in the arrangement shown in Fig. 18. The compensation of the pressure differences is effected as previously described. The membrane may also be an annular one passing under all the pressure plates and acting on the same much in the same way as before.

Figs. 20 and 21 show the application of the pressure device described in a frictional gear and a brake respectively. Fig. 20 represents a frictional gear as described in my copending application Ser. No. 603,418. In this arrangement 24 is the driving shaft having a collar 26 against which the base plate 6 of the pressure device bears. The base plate 6 is besides keyed on the shaft 24, so that it will rotate with the same.

The carrier disk is also fixed to the base plate 6 so that it rotates with the same. The connection may be effected by pressing these parts together. The second carrier disk 4 is fixedly secured to the race ring 21, which is loosely mounted on the shaft 24. The balls or rollers 23 of the frictional gear run in a cage 29 secured on the driven shaft. They roll on the outer race ring 22.

The operation of the frictional gear is known in itself and has been fully explained in my copending application. When the gear is under load the members 21, 4, 1 tend to rotate relatively to the members 24, 6, 5, 2 and the balls 3 between the parts 2 and 1 thereby exert a pressure on these parts. The pressure plate will endeavour to displace the race ring 21 to the left. The race ring is therefore continuously reciprocated to a small extent and to avoid friction and wear of the shaft 24, the latter may be coated with a bushing 25 of bronze or white metal.

In Fig. 21 the pressure device 1, 2, 3, 4, 5 is shown applied to a coupling or brake. The arrangement of parts is substantially the same as that in Fig. 20, but instead of the race ring, the disk 31 is connected with the members 1, 4 of the pressure device, while the other side 2, 5, 6 of the device bears against the collar 40 of the shaft 39. The second pressure disk 32 is keyed on the shaft 39 and between the two disks 31 and 32, the brake disk or coupling disk 33 is arranged. This disk is freely rotatable on the shaft 39 and is also movable in longitudinal direction. For this purpose, it is mounted on a hub 34. The pressure disk 31, which is also slightly movable in axial direction on account of the play with which the balls 3 are inserted between the parts 1 and 2, has a sleeve, which may be moved in the direction of the arrows 41 or 42 by hand. When moved in the direction of the arrow 42, the pressure disk 31 is out of frictional engagement with the brake or coupling disk 33. It then occupies the position shown at 37 in dotted lines. The shaft 39 may in this case rotate freely without tending to make the disk 33 rotate.

If on the other hand the sleeve is moved in the direction of the arrow 41, the disk 31 comes into frictional contact with the disk 33 and tries to rotate relatively to the parts 2, 5, 6. Thereby the pressure device is actuated. If the disk 33 is connected with another shaft, this second shaft is rotated and the arrangement is that of a coupling by friction. If however the disk 33 is a fixed one, a braking action will be exercised upon the shaft 39.

Of course various modifications may be made in the arrangement shown without departing from the scope of the invention.

What I claim is:

1. In a pressure device of the kind described, spaced disks facing one another, one of said disks being turnable relatively to the other disk, separate hard metal pressure plates inserted in said disks and each having inclined surfaces, the inclined surfaces of the pressure plates of one disk facing the inclined surfaces of the pressure plates of the opposite disk, and rolling elements arranged between the disks and each engaging the inclined surfaces of a pair of the oppositely disposed pressure plates.

2. A pressure device as claimed in claim 1 in which the inclined surfaces of each pressure plate diverge in opposite directions away from the central portion of the plate.

3. In a pressure device as claimed in claim 1, a cage between the disks provided with supported faces holding said rolling elements against radial displacement.

4. In a pressure device as claimed in claim 1, a supporting member backing each of said disks.

5. A pressure device as claimed in claim 1 in which each pressure plate is secured to its carrying disk to prevent movement relative to the disk which carries the same.

6. In a frictional gearing with a number of rolling bodies running between races, a pressure device for applying pressure to said bodies consisting of disks facing each other, a set of rolling bodies inserted between said disks, separately manufactured pressure plates inserted in said disks and facing each other, the rolling bodies of the pressure device being inserted between said pressure plates and co-operating therewith.

7. In a frictional gearing with a number of rolling bodies running between races, a pressure device for applying pressure to said bodies, consisting of disks facing each other, a set of rolling bodies inserted between said disks, separately manufactured pressure plates inserted in said disks and facing each other, the rolling bodies of the pressure device being inserted between said pressure plates and co-operating therewith and means to ensure uniform and equal pressure of the rolling bodies upon said pressure plates.

8. In a frictional gearing with a number of rolling bodies running between races, a pressure device for applying pressure to said bodies, consisting of disks facing each other, a set of rolling bodies inserted between said disks, separately manufactured pressure plates inserted in said disks and facing each other, the rolling bodies of the pressure device being inserted between said pressure plates and co-operating therewith and pressure equalizing devices associated with said pressure plates to ensure uniform transmission of pressure from the pressure plate upon the disks.

9. A pressure device of the kind specified comprising carrier disks, rolling bodies inserted between them and pairs of separately manufactured hard metal pressure plates with V-shaped inclined planes inserted in said carrier disks co-operating with said rolling bodies.

10. In a pressure device of the kind specified, comprising circular carrier-disks and pairs of separately manufactured pressure plates with V-shaped inclined planes held by said carrier disks, said planes being so arranged that the lines of intersection between them are directed radially with respect to the axis of the disks and substantially cylindrical rolling bodies co-operating with said inclined planes, the axis of the cylinders being substantially parallel to said lines of intersection.

11. In a pressure device according to claim 10, the rolling bodies being arranged within a cage having supporting surfaces, parallel to the base of the cylinders.

In testimony whereof I hereunto affix my signature.

RICHARD ERBAN.